United States Patent
Asaba et al.

[11] Patent Number: 5,146,084
[45] Date of Patent: Sep. 8, 1992

[54] ROTARY CODE DISK MOUNTING STRUCTURE FOR AN OPTICAL ENCODER WITH AN ADHESIVE SUBSTANCE FILLING THE CIRCULAR RECESS OF THE SPINDLE FOR ADHERENCE TO SAID DISK

[75] Inventors: Eiki Asaba; Yoshihito Tanabe, both of Yamanashi, Japan

[73] Assignee: Fanuc, Ltd., Yamanashi, Japan

[21] Appl. No.: 474,081
[22] PCT Filed: Aug. 31, 1989
[86] PCT No.: PCT/JP89/00894
  § 371 Date: Apr. 20, 1990
  § 102(e) Date: Apr. 20, 1990
[87] PCT Pub. No.: WO90/02316
  PCT Pub. Date: Mar. 8, 1990

[30] Foreign Application Priority Data
Aug. 31, 1988 [JP] Japan ................... 63-214936

[51] Int. Cl.$^5$ .................................. G01D 5/34
[52] U.S. Cl. ................ 250/231.14; 250/237 G; 427/232
[58] Field of Search ............ 250/231.14, 231.16, 250/231.17, 231.18, 237 G; 341/31; 427/232, 234, 235, 238

[56] References Cited

U.S. PATENT DOCUMENTS

| | | | |
|---|---|---|---|
| 1,747,678 | 2/1930 | Neely et al. | 427/234 |
| 2,319,657 | 5/1943 | Brown | 427/234 |
| 4,295,573 | 10/1981 | Terry et al. | 427/234 |

FOREIGN PATENT DOCUMENTS

50959 4/1973 Japan.
56-47709 4/1981 Japan.

Primary Examiner—David C. Nelms
Assistant Examiner—T. Davenport
Attorney, Agent, or Firm—Nikaido, Marmelstein, Murray & Oram

[57] ABSTRACT

The present invention is directed to a rotary code disk mounting structure for an optical encoder. A rotary code disk (3) with no center hole is fastened to a spindle (2) by an adhesive (J) that a is put in a recess (21) formed in a mounting surface (20). The mounting surface (20) is formed on the top surface of the spindle (2) with the central portion of the backside of the rotary code disk (3) in contact with the mounting surface (20). The rotary code disk mounting structure is applied to optical encoders for use in combination with servometers, machine tools and measuring apparatuses.

5 Claims, 3 Drawing Sheets

ROTARY CODE DISK MOUNTING STRUCTURE FOR AN OPTICAL ENCODER WITH AN ADHESIVE SUBSTANCE FILLING THE CIRCULAR RECESS OF THE SPINDLE FOR ADHERENCE TO SAID DISK

DESCRIPTION

BACKGROUND OF THE INVENTION

The present invention relates to a structure for mounting a rotary code disk on a rotary shaft of an optical encoder for use in combination with a servomotor, a machine tool or a measuring apparatus.

FIG. 4A is a schematic sectional view of a conventional rotary code disk mounting structure, FIG. 4B is an enlarged sectional view of an essential portion of the same rotary code disk mounting structure, and FIG. 4C is an exploded perspective view of the same rotary code disk mounting structure. Referring to FIGS. 4A, 4B and 4C, when mounting rotary code disk 3 made from 3 mm thick glass and having a central hole 30 on a spindle 2, the rotary code disk 3 is placed on the lapped support surface 20 of the spindle 2, a ring 4 is put on the head 25 of the spindle 2 projecting through the central hole 30 of the code disk 3, the ring 4 is depressed with a jig so that the tongues 41 of the ring 4 are bent to fasten the code disk 3 temporarily on the support surface 20, the code disk 3 is centered with a microscope while the spindle 2 is rotated, and then the ring 4 is buried in an adhesive J to fasten the code disk 3 to the spindle 2.

This conventional rotary code disk mounting structure fastens the code disk 3 to the spindle 2 by bonding a portion of the upper surface of the code disk 3 around the central hole 30 and the outer circumference of the projecting head 25 with the adhesive J. Therefore, the diameter $D_0$ of the head 25 must be comparatively large to secure a desired fastening strength, and thus the diameter of the center hole 30 of the code disk 3 must be comparatively large. The center hole 30 reduces the impact strength of the glass code disk 3, and thus the code disk 3 provided with the center hole 30 must be comparatively thick. Furthermore, the code disk 3 provided with the center hole 30 requires an additional process for forming the center hole 30.

The present invention is intended to eliminate the foregoing disadvantages by employing a novel mounting structure.

SUMMARY OF THE INVENTION

As shown in FIGS. 1 and 2A, by way of example, a rotary code disk 3 having no center hole is placed on the top surface 20 of a spindle 2 provided with a central recess 21 and a plurality of peripheral cuts 22, and the central portion of the backside of the rotary code disk 3 is bonded to the top surface 20 by an adhesive J contained in the recess 21.

Since the rotary code disk is not provided with a center hold such as the center hole 30 of the conventional rotary disk (FIG. 4C), the strength of the rotary disk of the present invention is higher than the conventional rotary code disk having a thickness the same as that of the former.

Also the omission of a process of forming a central hole in the code disk 3 and the ring 4 for temporarily fastening the code disk to the spindle rationalizes the, code disk fabricating and assembling processes.

DETAILED DESCRIPTION OF THE PREFERRED EMBODIMENT

Example 1

Figure 1:
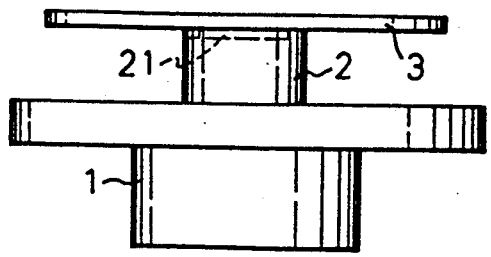
FIG. 1 is a side elevation showing a rotary code disk mounting structure embodying the present invention.
Figure 2A:
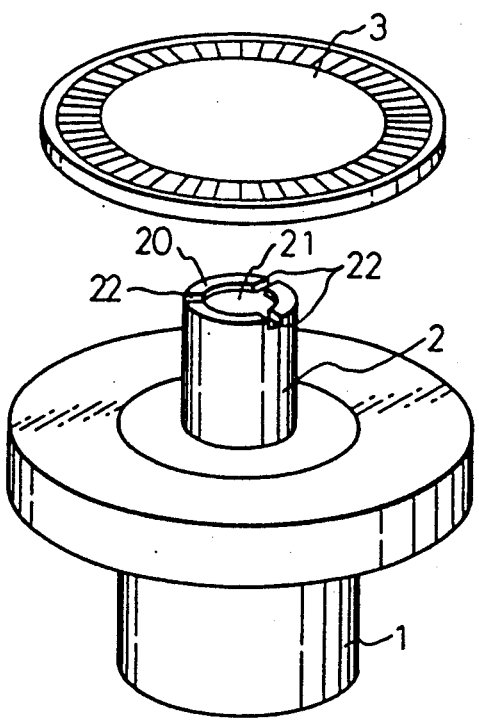
FIG. 2A is an exploded perspective view of the rotary code disk mounting structure of FIG. 1.

As shown in FIGS. 1 and 2A, rotary code disk 3 has the same size and shape as the conventional rotary code disk, except that the rotary code disk 3 is not provided with a center hole.

Figure 2B:
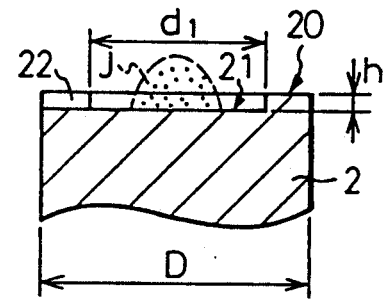
FIG. 2B is a sectional view of an essential portion of the rotary code disk mounting structure of FIG. 1.
Figure 3:
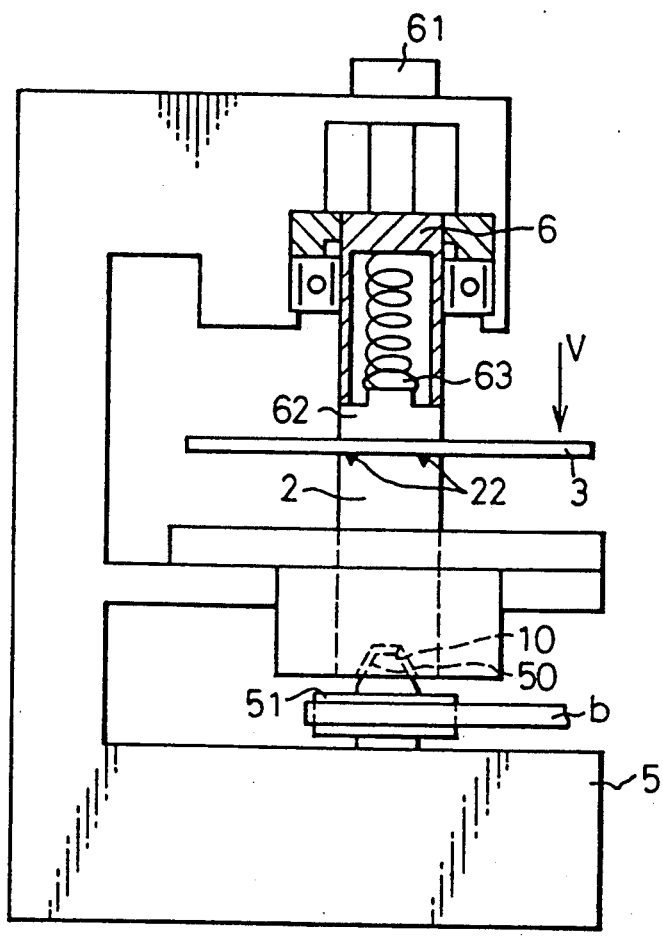
FIG. 3 is a view of assistance in explaining a manner of centering in accordance with the present invention.
Figure 4A:
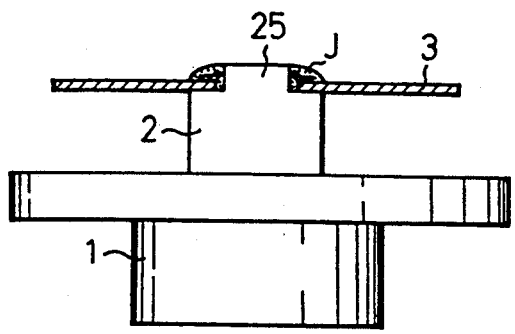
FIG. 4A is a side elevation of a conventional rotary code disk mounting structure.
Figure 4C:
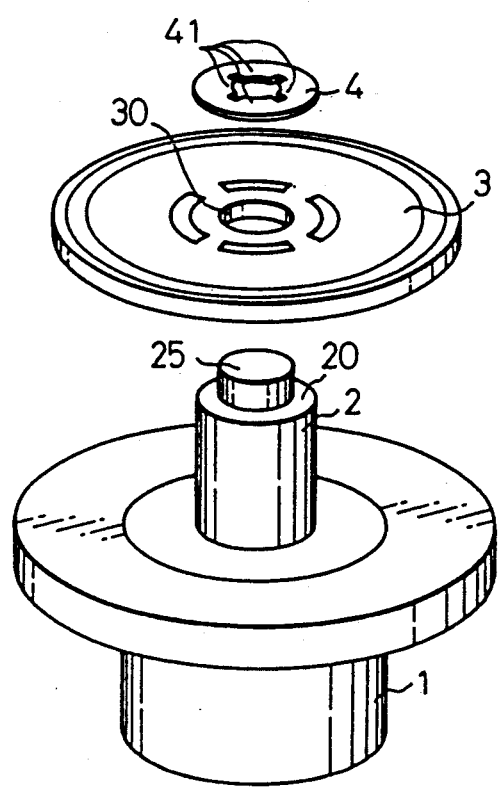
FIG. 4C is an exploded perspective view of the rotary code disk mounting structure of FIG. 4A.
Figure 4B:
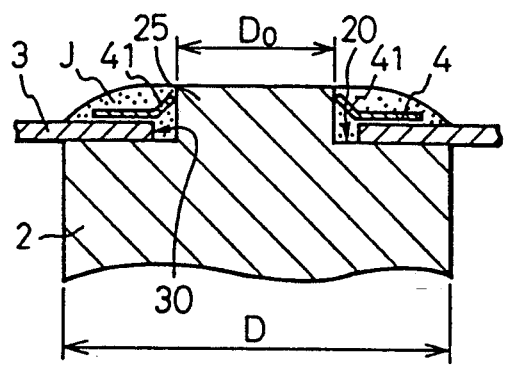
FIG. 4B is a sectional view of an essential portion of the rotary code disk mounting structure of FIG. 4A.

A flange 1 is of a conventional type. A spindle 2 has a lapped mounting surface 20 of 20 mm in diameter provided with a central circular recess 21 of 14 mm in diameter and 0.3 mm in depth, and three cuts 22 formed in a mounting surface surrounding the circular recess 21 at equal angular intervals. The spindle 2 was put on a pulley 51 of a centering stand 5 with a center recess 10 formed in the bottom surface thereof receiving a center projection 50 formed on the pulley 51 as shown in FIG. 3. An appropriate amount of an epoxy adhesive (Trade name: Araldyte AV 138) was put in the central portion of the recess 21 formed in the top surface of the spindle 2 as shown in FIG. 2B. The code disk 3 was placed on the mounting surface 20 of the spindle 2, and then a rubber presser block 62 was pressed through a spring 63 against the code disk 3 by turning the knob 61 of a pressing jig 6. When the backside of the code disk 3 was pressed firmly against the lapped mounting surface 20 of the spindle 2, a portion of the adhesive J was forced outside the recess 21 through the cuts 22. Then the code disk 3 was centered by observing the code disk 3 with a microscope along a direction indicated by the arrow V, while the pulley 51 was rotated through a belt b. After centering the code disk 3, the pressing jig 6 was set to keep the rubber presser block 62 pressed through the spring 63 against the code disk until the adhesive J solidified.

Although the amount of the adhesive J used was somewhat greater than the volume of the recess 21, the surplus portion of the adhesive J was pressed outside the recess 21 through the cuts 22, which also serve as air escapes. Therefore, the adhesive J did not penetrate between the code disk 3 and the mounting surface 20 of the spindle 2, and the code disk 3 was fastened adhesively to the mounting surface 20 of the spindle 2 with the backside thereof in precise contact with the mounting surface 20.

Example 2

The process of putting the adhesive J in the recess 21 of the spindle 2 as in Example 1 was omitted. That is, the spindle 2 and the rotary code disk 3 were set on the centering stand 5 as shown in FIG. 3 without putting the adhesive J in the recess 21 of the spindle 2, the rotary code disk 3 was centered with the rubber presser block 62 of the pressing jig 6 pressed through the spring 63 against the rotary code disk 3, an epoxy adhesive was injected through the cuts 22 into the recess 21 with a syringe, not shown, to fill up the recess 21 and the cuts 22 with the epoxy adhesive, and then the adhesive was solidified.

The code disk 3 is centered by tapping the rim of the code disk 3 with a hammer observing the runout of the code disk 3 while the spindle is turned slowly. Since the code disk 3 is centered before the adhesive is put in the recess 21 in Example 2, the adhesive J does not wet the lapped mounting surface and the backside of the code disk even if the code disk is shifted in the centering process by a considerably large distance in a plane relative to the spindle. Accordingly, the centering work is simplified and the code disk 3 can be precisely mounted on the mounting surface and is fastened adhesively to the mounting surface without allowing the adhesive J to enter between the backside of the code disk 3 and the lapped mounting surface 20 of the spindle 2.

Modification

When the adhesive injecting means employed in Example 2 is used, radial grooves 22 formed in the lapped mounting surface of the spindle 2 as one type of the recess 21 facilitate the injection of the adhesive.

What is claimed is:

1. A rotary code disk mounting structure for an optical encoder, comprising:

a flange;

a spindle mounted on a top surface of said flange, said spindle having defined on a top end thereof a central circular recess; and a rotary code disk adhesively mounted on said spindle, said rotary code disk having an adhesive substance filling the circular recess for adhering said rotary code disk to said spindle.

2. A rotary code disk mounting structure for an optical encoder as set forth in claim 1, wherein said spindle has further defined on the top end at least one radially extending cut forming an opening between the circular recess and an outside surface of said spindle.

3. A rotary code disk mounting structure for an optical encoder made from the process which includes the steps of:

forming a spindle on a top surface of a flange;

forming on a top end of said spindle of a central circular recess;

filling the central circular recess with an adhesive substance;

mounting a rotary code disk on the top end of said spindle to cover the circular recess; and applying pressure to said rotary code disk for a time period so as to allow the adhesive substance to solidify.

4. A rotary code disk mounting structure for an optical encoder as set forth in claim 3, said mounting structure being made from the further step of:

forming on the top end of said spindle at least one radially extending cut forming an opening between the circular recess and an outside surface of said spindle.

5. A rotary code disk mounting structure for an optical encoder as set forth in claim 4, said mounting structure being made from the further step of:

filling the circular recess with the adhesive substance through the radially extending cut after mounting said rotary code disk on said spindle.

* * * * *